United States Patent
Hallaman

[15] 3,694,040
[45] Sept. 26, 1972

[54] TRACTION BELT

[72] Inventor: Allan D. Hallaman, 1156 Dietz Ave., Akron, Ohio 44301

[22] Filed: Aug. 19, 1970

[21] Appl. No.: 65,060

[52] U.S. Cl. ................................................. 305/38
[51] Int. Cl. ............................................ B62d 55/24
[58] Field of Search ........................... 305/35 EB, 38

[56] References Cited

UNITED STATES PATENTS

| | | | |
|---|---|---|---|
| 3,205,023 | 9/1965 | Nodwell | 305/38 |
| 2,936,196 | 5/1960 | Baudelot | 305/35 EB |
| 2,461,150 | 2/1949 | Flynn | 305/35 EB |
| 3,451,728 | 6/1969 | Bruneau | 305/35 EB |
| 2,025,999 | 12/1935 | Myers | 305/38 |

*Primary Examiner*—Richard J. Johnson
*Attorney*—W. A. Shira, Jr. and Joseph J. Januszkiewicz

[57] ABSTRACT

An endless traction belt for vehicles having at least two endless bands laterally spaced, the bands being transversely interconnected by grouser bars attached to the outer surface of the bands. The grouser bars are longitudinally spaced on the bands with the region laterally intermediate the bands adapted to be contacted by driving-sprocket teeth. Transverse lugs of elastomeric material are formed on the outer periphery of the bands to a greater height than the grouser bars and the lugs are disposed closely adjacent opposite sides of each grouser bar such that the grouser bars are recessed between and supported by the lugs to prevent shearing of the grouser attaching means.

2 Claims, 3 Drawing Figures

INVENTOR.
ALLAN D. HALLAMAN
BY W. A. Shira, Jr.
ATTY.

TRACTION BELT

BACKGROUND OF THE INVENTION

Elastomeric traction belts are commonly used for propelling tracked vehicles designed for traversing soft surfaces such as mud, sand, soft earth and snow. Such belts are particularly suited for use on recreational vehicles of the type known as snowmobiles. Snowmobiles are usually supported by a suspension provided with at least one driving track and a pair of steerable skiis with the latter being mounted in front of the driving track. The driving track may either be a single endless band with apertures formed through the surface of the belt in longitudinally equally spaced arrangement for engaging driving sprocket teeth, or the traction belt may be formed by transversely interconnecting a plurality of laterally spaced bands. In this latter type of traction belt, one popular technique of laterally interconnecting the spaced bands is that of providing transversely or laterally extending bars on the outer periphery of each band with the bars extending to interconnect all of the bands. These bars are known as grouser bars, and are usually shaped in transverse cross section so the outer edges thereof contact the surface traversed such that the vehicle track tends to rest on the grouser bars.

Grouser bars are also provided in snowmobile traction belts to provide lateral stiffness to the belt and further to provide a rigid portion intermediate the laterally spaced bands, which portion is adapted to contact, in a driving manner, the surface of the sprocket teeth. Thus, as mentioned above, several endless tracks bands may be joined laterally by grouser bars with the bars providing the surface for engaging the sprocket teeth, making it unnecessary to form apertures through the surface of the elastomeric belt. This particular type of belt construction has been found to be quite economical and has gained wide usage in the manufacture of snowmobiles.

However, the means of attaching the grouser bars to the elastomeric bands have caused difficulties. Rivets are commonly used for attachment of the grouser bars to the track as a manufacturing expedient or, alternatively, the grouser bar is bonded directly to the surface of the band during vulcanization without using separate mechanical fasteners. In service, as the grouser bars contact and drive over the surface to be traversed, the driving forces of the track belt are transmitted to the belt through the rivets attaching the grouser bars, and these forces tend to rotate the grouser bars with respect to the surface of the elastomeric belt and further to shear the grouser bar fastening means in a direction longitudinally of the belt. When the vehicle traverses intermittently hard and soft surfaces as, for example, soft snow then hard pavement, or ice, the grouser bar attaching means is subjected to high impulse shocks as the vehicle encounters sudden changes in the surface. Quite often rivet failure, or elastomeric band failure, is encountered and the grouser bars become detached from the track belt.

As mentioned above, grouser bars are provided to give additional lateral stiffness to the traction belt and for absorbing the driving loads of the sprocket. However, it has been found, curiously enough, that such bars do not increase the tractive ability of the belt over hard surfaces as ice or hard packed snow. When the snowmobile encounters ice, for example, the grouser bars will often provide even less traction than an elastomeric traction surface due to the tendency of the surfaces of the grouser bars to "ice skate." In particular, if the vehicle is turned suddenly the grouser bars will cause the vehicle to slide sideways and often to spin out uncontrollably. Therefore, it has been desirable to find a technique to permit utilizing the grouser bars for stiffness and sprocket teeth engagement, yet provide an attachment of the grouser bars which would not be subject to premature failure and further provide for preventing the loss of traction on hard surfaces by the skating of the grouser bars.

SUMMARY OF THE INVENTION

The present invention provides a solution to the above-described problem by providing a traction belt having several endless elastomeric track bands spaced laterally and interconnected by metal grouser bars rigidly attached to the outer surface of each of the bands and extending transversely between the bands. Traction increasing portions in the form of transverse integral elastomeric lugs are formed on the outer surface of each of the traction belts and extend outwardly therefrom a distance greater than the height of any of the grouser bars such that the bars are recessed below the outer surface of the lugs. Thus, the elastomeric traction increasing portions or lugs contact the surface being traversed by the belt before the grouser bars, thereby preventing the grouser bars from direct contact with the surface being traversed. The transverse traction lugs are formed closely adjacent opposite sides of each grouser bar so as to provide resilient support for resisting relative rotation about an axis transverse to the belt, or shear of the grouser fastening means in a direction longitudinally of the belt.

The present traction belt thus retains the grouser bar for providing lateral stiffness and resistance to sprocket tooth loads, yet portions of the elastomeric belt absorb the driving loads on the grouser bar thereby preventing detachment of the grouser bars from the belt during severe service.

DETAILED DESCRIPTION

Figure 1:
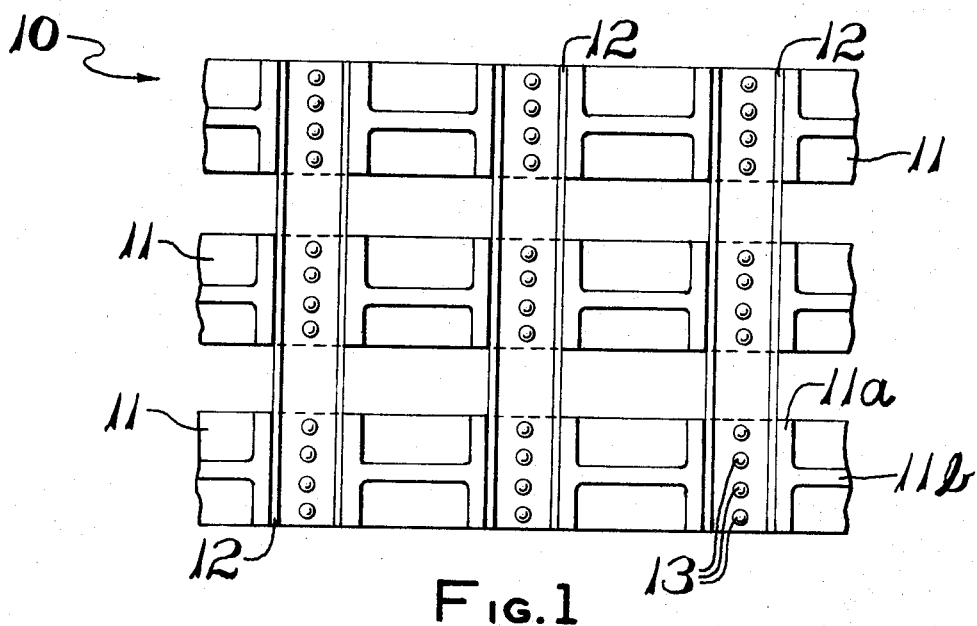
FIG. 1 is a plan view of a portion of the presently preferred form of the traction belt.
Figure 2:
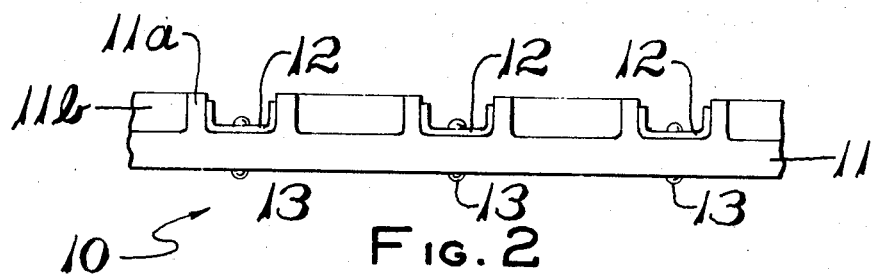
FIG. 2 is a side elevation view of the embodiment of the belt shown in FIG. 1.
Figure 3:
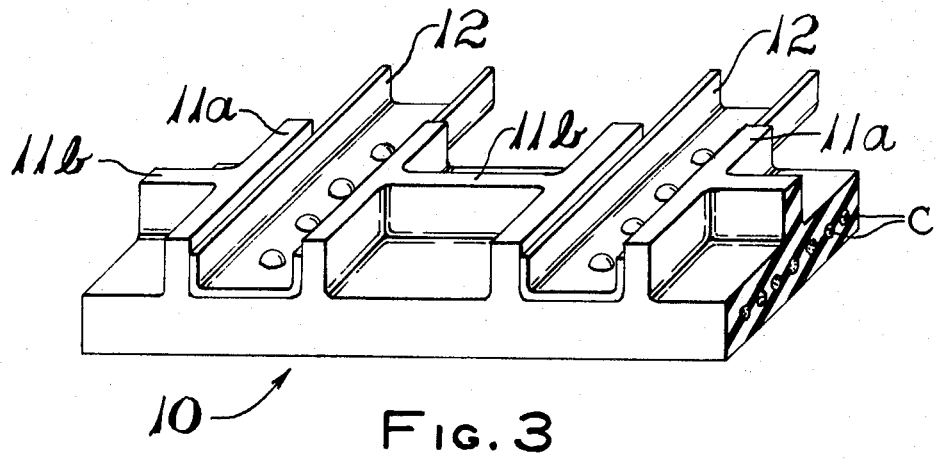
FIG. 3 is an isometric view of a portion of one of the endless bands of the belt of FIG. 1 showing details of the grouser bar attachment and traction lugs.

Referring now to FIG. 1 and 3, the snowmobile traction belt 10 is comprised of a plurality of endless track bands 11 of elastomeric material, preferably reinforced with tension cords C with the bands disposed in laterally spaced parallel arrangement so as to orbit in parallel, equally spaced, paths. The endless bands 11 are interconnected by a plurality of grouser bars 12 of rigid material, preferably metal, attached to the outer surface of each of the bands 11 such that each of the bars 12 extends transversely the entire width of the traction belt 10. The bars 12 are longitudinally spaced equally along the surface of the bands 11 an amount determined by the desired pitch of the driving sprocket (not shown) to be engaged on a snowmobile. In the presently preferred form of the invention, shown in FIG. 1, three of the endless bands 11 are provided so as to permit driving by two axially spaced sprockets. The grouser bars are engaged on the sides thereof by the sprockets along the portion of their length intermediate the spaced bands 11. However, it will be understood that if desired, only two of the bands 11 may be used with the belt 10 being engaged by a single sprocket.

The grouser bars 12 are preferably attached mechanically to the track belt bands 11 by an convenient expedient sufficient to absorb the sprocket driving loads. In the present preferred form of the invention, rivets 13 are utilized with each of the rivets penetrating the thickness of the band to attach the grousers to the bands 11. However, other fastening means may be used, for example bolts or, alternatively, directly bonding the metal grouser to the band by vulcanization. The presently preferred grouser bar 12 is formed of sheet metal stamped to a U-shape, or cup shape, in transverse cross section with the open edges extending outwardly from the surface of the traction belt. However, it will be understood the grouser bars may also be made as solid bars formed to any convenient polygonal shape or, alternatively, by round bars.

Referring now to FIG. 3, each of the endless bands 11 has a plurality of traction increasing lugs 11a formed on the outer surface thereof with the lugs extending transversely of the bands 11. The lugs are formed integrally with the bands 11 and are disposed adjacent the edges of each of the grouser bars in a manner so as to support the grouser bars longitudinally of the bands 11.

Preferably, as shown, the lugs on either side of a grouser bar have the surfaces adjacent the latter in contact therewith and complementary in shape thereto. Each of the lugs 11a extends outwardly from the surface of the band 11 by a distance greater than the height of the grouser bar. In the presently preferred practice of the invention, the transverse traction lugs 11a extend outwardly from the surface of the belt generally one-sixteenth of an inch further than the grouser bars; however, it will be understood that the lugs 11a may extend a greater amount if so desired. Preferably as illustrated in FIG. 3, the transverse lugs 11a extend the full lateral width of each of the bands 11. However, the lugs 11a, if desired, may extend a lesser amount than the full width of the band 11 with the length of the lugs 11a being determined by the requirements for providing rotational support for the grouser bars 12 about the fasteners 13.

A plurality of longitudinally extending lugs 11b is also provided on the outer surface of each of the endless bands 11 in the preferred form of the invention. The longitudinally extending lugs 11b are disposed intermediate the axial edges of each of the bands 11 with each of the lugs 11b extending longitudinally so as to interconnect adjacent transverse lugs 11a. The longitudinal lugs 11b are provided for increasing the resistance of the traction belt 10 to lateral skidding and thus provide for better directional tracking. Each of the longitudinal lugs 11b is integral with and preferably extends from the surface of the traction belt to the same height as the transverse lugs 11a. However, if desired, the longitudinal lugs 11b may be recessed below the height of the transverse lugs 11a. In the preferred practice of the invention illustrated in FIGS. 1 and 3, only one longitudinal lug 11b has been provided for interconnecting adjacent transverse lugs 11a. However, it will be understood that more than one longitudinal lug 11b may be provided intermediate any two adjacent transverse lugs 11a, if desired, to provide increased tracking ability or to provide desirable appearance to the pattern of the traction lugs 11a and 11b.

The present invention thus provides an endless elastomeric traction belt for snowmobiles having grouser bars laterally interconnecting spaced traction bands. Lug portions formed on the outer surface of each of the traction bands adjacent the grouser bars extend to a greater height than the bars such that the grouser bars do not normally contact the surface being traversed by the vehicle and movement of the grouser bars relative to the surface of the belt is resisted by the lugs.

Modifications and adaptations of the invention may be made by those having ordinary skill in the art and the invention is limited only by the spirit and scope of the following claims.

I claim:

1. An endless traction belt of reinforced elastomer for sprocket-driven tracked vehicles characterized in that the said belt has:
   a. a plurality of endless flexible track bands disposed so as to orbit in axially spaced parallel arrangement;
   b. a plurality of elongated grouser bars of rigid material mounted transversely on the outer periphery of said bands in longitudinally spaced parallel arrangement with each bar interconnecting transversely all of said bands and with the portions of each bar intermediate said track bands being adapted to contact the teeth of at least one driving sprocket;
   c. a plurality of transverse lugs formed integrally on the outer periphery of each of said bands and extending outwardly therefrom an amount greater than the height of said grouser bars with one of said lugs disposed closely adjacent respectively opposite sides of each of said grouser bars, the transverse lugs between each pair of grouser bars being spaced from each other in a direction longitudinally of said belt; and,
   d. a plurality of longitudinal lugs extending outwardly from the outer periphery of each of said bands with one of said longitudinal lugs disposed longitudinally intermediate each two of said adjacent grouser bars and with each of said longitudinal lugs extending longitudinally of said track band integral therewith and with the said transverse lugs adjacent each of said grouser bars, the transverse width of each of said longitudinal lugs being substantially less than the width of the band on which it is located.

2. The traction belt defined in claim 1, further characterized in that each of said longitudinal lugs extends outwardly from the outer periphery of said band the same distance as said transverse lug portions.

* * * * *